United States Patent

Kwon

[11] Patent Number: 5,548,662
[45] Date of Patent: Aug. 20, 1996

[54] EDGE EXTRACTING METHOD AND APPARATUS USING DIFFUSION NEURAL NETWORK

[75] Inventor: Yool Kwon, Kyungki-Do, Rep. of Korea

[73] Assignee: LG Electronics Inc., Seoul, Rep. of Korea

[21] Appl. No.: 156,716

[22] Filed: Nov. 24, 1993

[30] Foreign Application Priority Data

Feb. 8, 1993 [KR] Rep. of Korea ............. 1682/1993

[51] Int. Cl.$^6$ ................................................ G06K 9/62
[52] U.S. Cl. ................................. 382/158; 382/156
[58] Field of Search ........................... 382/14, 22, 155, 382/156, 157, 158, 159, 199, 279; 395/21, 24, 25

[56] References Cited

U.S. PATENT DOCUMENTS

| | | | |
|---|---|---|---|
| 4,472,786 | 9/1984 | Larson | 382/22 |
| 4,803,736 | 2/1989 | Grossberg et al. | 395/25 |
| 4,972,495 | 11/1990 | Blike et al. | 382/22 |
| 5,101,440 | 3/1992 | Watanabe | 382/22 |
| 5,109,425 | 4/1992 | Lawton | 382/22 |
| 5,121,443 | 6/1992 | Tomlinson | 382/14 |
| 5,142,592 | 8/1992 | Moler | 382/25 |
| 5,259,038 | 11/1993 | Sakou | 382/14 |
| 5,311,600 | 5/1994 | Aghajan | 382/22 |

Primary Examiner—Yon J. Couso

[57] ABSTRACT

Edge extracting method and apparatus using a neural network performing a function of diffusing an excitation. The method and apparatus continuously detect a variety of intensity changes of an image via a function having a variety of frequency characteristics. An edge of a fixed object is detected from images continuously input, and an edge of a moving object is selectively detected from the images. The edge extracting apparatus includes a first neural network which receives an image signal. The first neural network derives a Gaussian function representing the regularity of an excitatory response and an inhibitory response to a spot excitation of the image signal. The apparatus also includes a second neural network which detects edges of an image represented by the image signal by convolving the Gaussian function and the image signal.

17 Claims, 5 Drawing Sheets

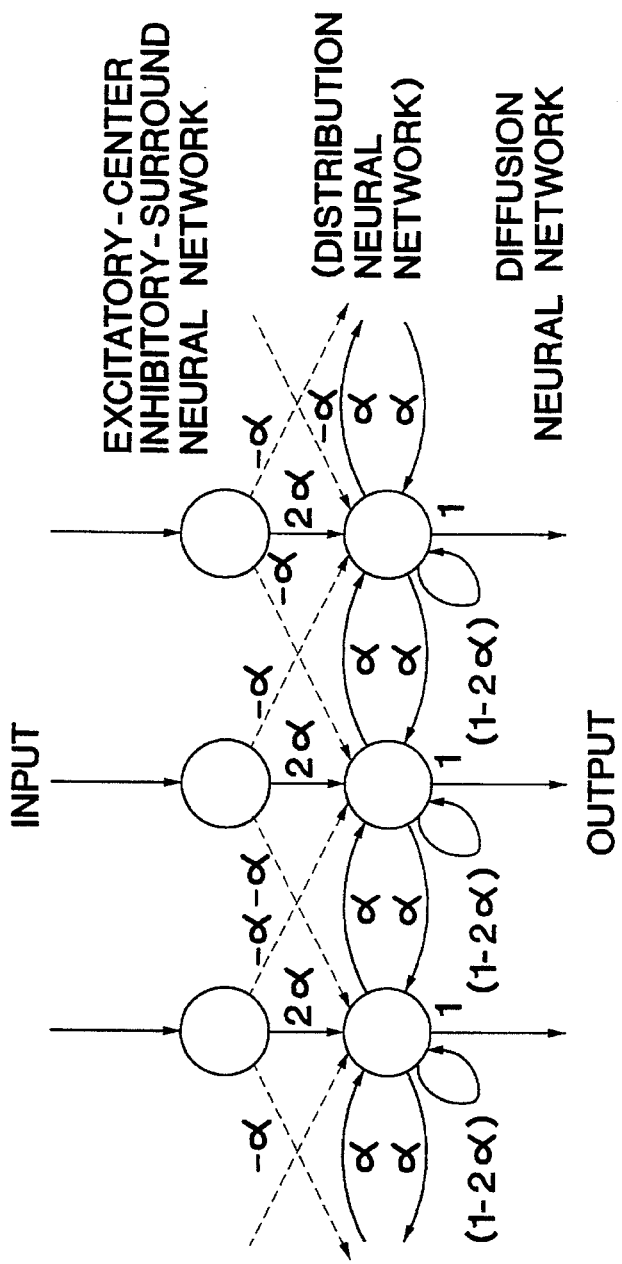
FIG. 3
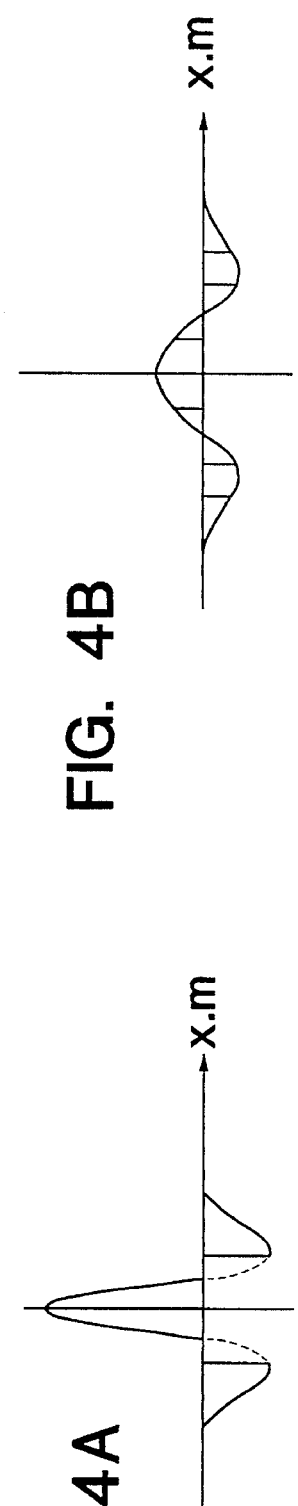
FIG. 4A
FIG. 4B

EDGE EXTRACTING METHOD AND APPARATUS USING DIFFUSION NEURAL NETWORK

BACKGROUND OF THE INVENTION

1. Field of the Invention

The present invention relates to and more particularly to edge extracting method and apparatus wherein edges of a fixed object and a moving object are detected from an image by a diffusion, delay, and differential neural network.

2. Description of the Prior Art

Recently, the visual processing abilities of animals have been studied applied and to image processors.

An eye of such an animal is constituted by neurons called ON units which exhibit an excitatory response to a spot excitation, and neurons called OFF units, which exhibit an inhibitory response to the spot excitation. By these ON units and OFF units, a neural response to the excitation appears in the form of superposed excitatory and inhibitory responses.

The regularity of such superposed excitatory and inhibitory responses is represented by two Gaussian functions G1 and G2. The neural response to the excitation is represented by a difference of boo Gaussian functions G1 and G2.

The Gaussian function G1 is $1/2\pi\sigma_1^2 \exp(x^2/-2\sigma_1^2)$, whereas the Gaussian function G2 is $1/2\pi\sigma_2^2 \exp(x^2/-2\sigma_2^2)$. The standard deviation $\sigma_2$ of the Gaussian function G2 is slightly larger than the standard deviation $\sigma_1$ of the Gaussian function G1.

The difference of the two Gaussian functions G1 and G2 can be expressed by a quadratic partial differential equation $\nabla^2 G$ of a Gaussian function satisfying the following equation:

$$\nabla^2 G = 1/2\pi\sigma_1^2 \exp(x^2/-2\sigma_1^2) - 1/2\pi\sigma_2^2 \exp(x^2/-2\sigma_2^2).$$

wherein, $\sigma_1 < \sigma_2$.

When the solution of the quadratic partial differential equation of the Gaussian function G is subjected to a Fourier's transform, the solution has a band pass filter characteristic, Since the standard deviation $\sigma$ is inversely proportional to a frequency w, a frequency band is determined according to a filter characteristic given by a user. Depending on the frequency w, the standard deviation $\sigma$ is determined.

In other words, when an image signal I is received, a standard deviation $\sigma$ is determined based on a frequency band of the image signal to be filtered. As a result, the image signal I is filtered at the frequency band determined by the standard deviation. At this time, the image signal I is convolution-operated with a Gaussian function G having the standard deviation determined by the frequency band of the image signal I to be filtered. Based on the operation result, zero crossings can be found (i.e., where a value is changed from positive to negative or vice versa). These zero crossings are the edge of the image.

In the above operation procedure, the convolution operation of the image signal with the Gaussian function is executed for every frame. For each pixel, the multiplication processing amount is proportional to the dimension of the Gaussian function, namely, the mask size. The mask size is also proportional to the square of the standard deviation $\sigma$.

In other words, the mask size is $72\sigma^2$ in a $\nabla^2 G$ function. For an edge of an image signal having a frequency of 1, the standard deviation $\sigma$ should be $\sigma 2$. In this case, the mask consists of 144 pixels. Where an image signal is filtered at a low frequency band, the determined standard deviation $\sigma$ is increased because it is proportional to the frequency of the image signal to be filtered. On the other hand, the mask size become larger because it is proportional to the square of the standard deviation $\sigma$.

As mentioned above, when the mask size is large, a large amount of processing is required to perform the convolution of the input image signal with the Gaussian function. As a result, constructing a hardware implementation is very difficult. Since the standard deviation $\sigma$ determines only one frequency band, a plurality of filters are needed for filtering an image signal with a variety of frequency characteristics. The software solution is also very difficult to implement because of the very slow processing speed. As a result, it is impossible to accomplish a real time processing of image signals.

There may also exist a situation requiring only the extraction of moving objects from a number of objects present in an image or the of tracks of the moving objects.

Conventional devices for sensing moving objects include a radar having a transmission function and an image processing device using a computer. In the case of the radar, the extraction of a moving object is achieved by detecting a difference between a frequency reflected from the moving object and a transmission frequency by utilizing a doppler effect that a frequency reflected from a moving object has a difference from a transmission frequency by a frequency proportional to the motion speed of the moving object. Since the waves reflected from the moving object are frequently varied in phase, this radar requires the use of a canceler for removing the reflected waves. For detecting frequencies with a small quantity of reflected waves, an expensive transmitter and receiver generating few errors should be used.

In the device for detecting a moving object using an image processing system having no transmission function, a canceler having a memory unit controlled by software issued. Good processing results can be obtained in so far as the canceler utilizes past information as much as possible, To this end, large memory capacity is required.

SUMMARY OF THE INVENTION

An object of the invention is to provide an edge extracting method and apparatus using a neural network performing a function of diffusing an excitation, and capable of continuously detecting a variety of intensity changes of an image by realizing a function having a variety of frequency characteristics obtained by the lapse of time, thereby detecting an edge of a fixed object from images continuously inputted and selectively detecting an edge of a moving object from the images.

Another object of the invention is to provide an edge extracting method and its application system using a neural network capable of performing a diffusion operation with very simple interconnections of neurons, obtaining a variety of results by the lapse of time, realizing a simple hardware implementation, achieving a high integrity in realizing a VLSI, and realizing a software implementation with small processing amounts.

In accordance with one aspect, the present invention provides an edge extracting apparatus using a diffusion neural network comprising: a distribution unit for deriving a diffusion regularity of an excitatory response and an inhibitory response to a spot excitation, deriving respective Gaussian functions for said excitatory response and said inhibitory response, based on said derived regularity, and applying a difference of said Gaussian functions to a neuron as an initial value; and a diffusion unit for performing a convolution of a response of said neuron to said excitation outputted from said distribution unit and fixed image signals continuously inputted, and thereby detecting edges of said image signals.

In accordance with another aspect, the present invention provides an edge extracting method comprising the steps of: applying a spot excitation to a neuron and operating respective Gaussian distribution functions for an excitatory response and an inhibitory response to said spot excitation diffused to neighboring neurons, based on a diffusion regularity of said excitatory response and said inhibitory response; and operating a difference between said two Gaussian distribution functions, deriving respective solution of the Gaussian distribution functions, outputting said solutions and detecting an edge of a fixed object by a convolution of a response of said neuron outputted and fixed image signals continuously inputted.

BRIEF DESCRIPTION OF THE DRAWINGS

Other objects and aspects of the invention will become apparent from the following description of embodiments with reference to the accompanying drawings in which:

FIG. 3 is a diagram illustrating a one-directional neural network model for detecting spatial intensity changes of an input image;

FIG. 4A is a graph illustrating a comparison between a $\nabla^2 G$ function with $\sigma^2$ of 0.5 and the result after a diffusion;

FIG. 4B is a graph illustrating a comparison between $\nabla^2 G$ function with $\sigma^2$ of 0.5 and the result after a diffusion:

DESCRIPTION OF THE PREFERRED EMBODIMENTS

In accordance with the present invention, $\nabla^2 G(x,y) * I(x,y)$ is utilized for extracting an edge of a motionless image. For extracting a target of a moving image and a track of the target, $Z(x,y,z)=[\partial(\nabla^2 G(x,y)/\partial t]* I(x,y)$ is utilized. Here, $G(x,y)$ stands for a Gaussian function with a standard variation of $\sigma^2$, $I(x,y)$ an input image, * a temporal and spatial convolution operation, and $Z(x,y,t)$ an output. By performing the convolution operation, the output $Z(x,y,t)$ can be expressed as follows:

$$Z(x,y,t) = \frac{d}{dt} \int_o^t \int_{-\infty}^{\infty} \int_{-\infty}^{\infty} \nabla^2 G(x-\zeta, y-\eta, t-\tau) I(x,y,t) d\zeta d\eta dt$$

where $\zeta, \eta$ are the variables in the x and y direction, and $\gamma$ is the variable with respect to time.

In accordance with the present invention, the Gaueslan function is realized by a diffusion neural network utilizing a concept of a diffusion. The function of $\nabla^2 G(x,y)$ is realized by a difference between two Gaussian functions with different standard deviations. Accordingly, the edge extraction can be achieved simply by the diffusion neural network utilizing the above concepts.

Figure 1:
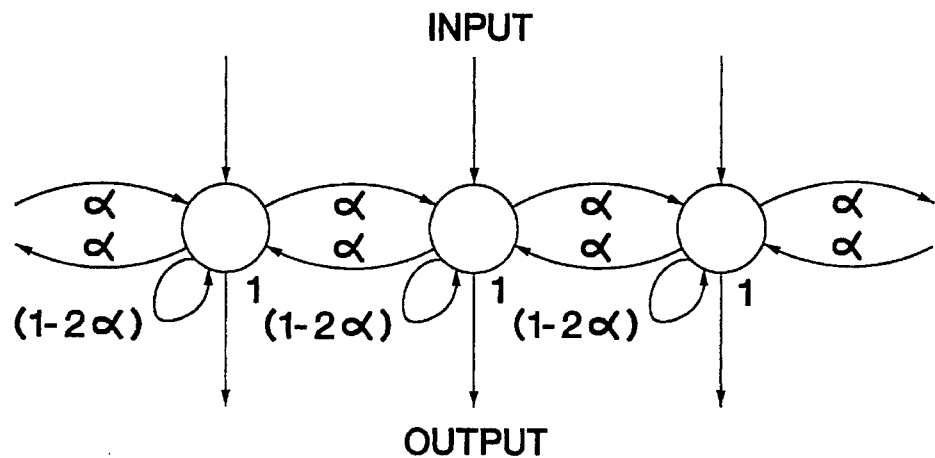
FIG. 1 is a diagram illustrating a one-dimensional diffusion neural network model with a diffusivity of $\alpha$ and a self decay coefficient of $(1-2\alpha)$.
Figure 2:
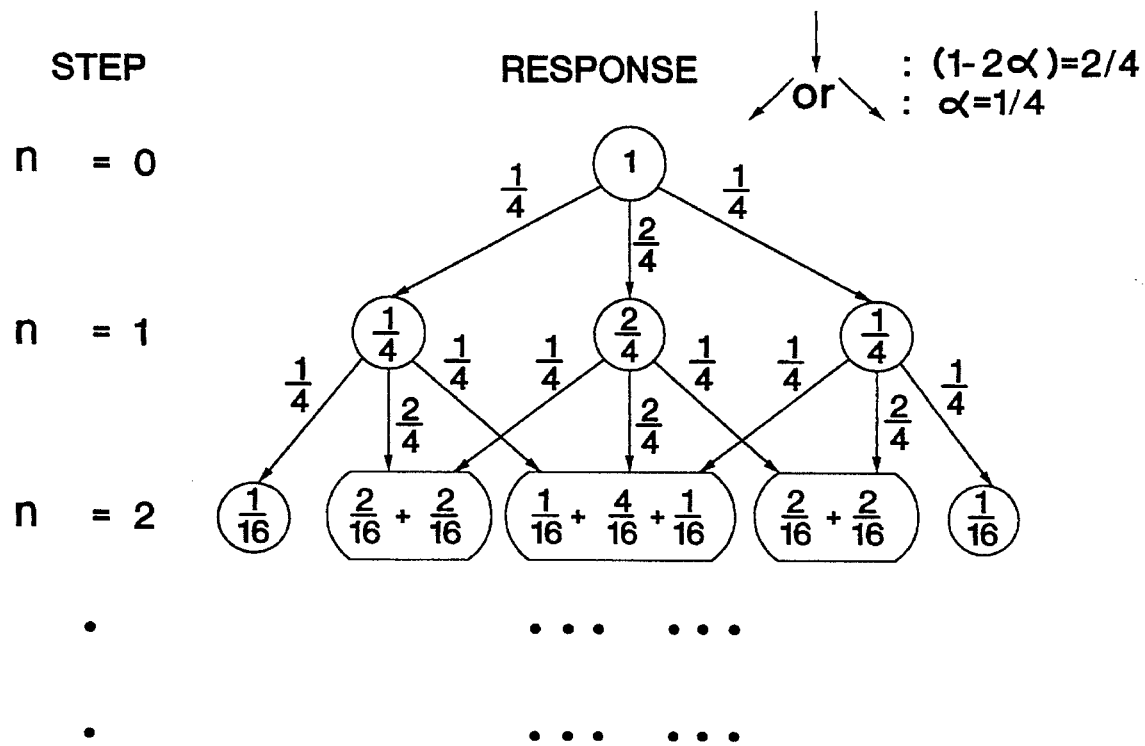
FIG. 2 is a diagram illustrating a response to a spot excitation in the model of FIG. 1 when the diffusivity is ¼.

FIG. 1 shows the model of a one-dimensional diffusion neural network which performs the Gaussian function according to the diffusion process. Each pixel of an input image corresponds to each neuron of the diffusion neural network. In the diffusion neural network, a convolution operation between an input $I(x)$ and a Gaussian function $G(x)$ is performed. When an external input, namely, an external spot excitation is applied to a neuron, it is diffused to the neighboring neurons. A simple example of such an external spot excitation diffusion is illustrated in FIG. 2. FIG. 2 shows that when the excitation "1" is applied to a neuron, that half of the previous excitation is transferred to itself (self decay) and a fourth of the excitation is transferred to the neighbors. The excitation "1" applied to a neuron results in the state (¼, 2/4, ¼) after a diffusion step, and (1/16, 4/16, 6/16, 4/16, 1/16) after one more diffusion. Gradually the distribution of the response approaches a Gaussian function. This diffusion model can obtain the same result, even if driven according to a heat conduction-expressing diffusion equation $\alpha \nabla^2 v = \partial v/\partial t$. A discrete one-dimensional solution can be derived as follows:

$$v(m, n+1) = \alpha v(m-1,n) + \alpha v(m+1,n) + (1-2\alpha)v(m,n) + v_o(m)\delta(n)$$

wherein, a stands for a diffusivity, m a spatial position, n the number of diffusion iterations, $v(m,n+1)$ represents the response of a neuron at the n+1 diffusion iteration located at position m, and $v_o(m)\delta(n)$ an initial value, The diffusion result is given by a Gaussian function with the variance of $\sigma^2 = 2\alpha n$. The diffusion neural network serves to make a Gaussian function form from an input. As apparent from the above description, the self decay coefficient is $1-2\alpha$ in a one-dimensional case and $1-4\alpha$ in a two-dimensional case. The diffusion neural network of FIG. 1 is the diffusion neural network designed to iterate the diffusion process of FIG. 2 by a single layer.

Now, a method for making a neural network having an edge detecting function will be described. The edge is detected by a neural network of the excitatory-center inhibitory-surround type which is the first layer of FIG. 3 and a diffusion neural network which is the second layer of FIG. 3. The excitatory-center inhibitory-surround type neural network has a function to perform an operation for $\nabla^2$ of $\nabla^2 G$. $\nabla^2$ corresponds to $\partial^2/\partial x^2$ in a one-directional case and $\partial^2/\partial x^2 + \partial^2/\partial y^2$ in a two-directional case. The function of $\nabla^2 G$ is produced by the excitatory-center inhibitory-surround type neural network and the diffusion neural network. This function is the Laplacian of a Gaussian (LOG) function capable of detecting intensity changes of an image.

FIGS. 4A and 4B are graphs respectively showing a one-directional function of $\nabla^2 G(x)$. The graph of FIG. 4A corresponds to the case of $\sigma^2=0.5$, whereas the graph of FIG. 4B corresponds to the case of $\sigma^2=0.5$. This function is well-known as the function capable of detecting intensity changes of an image. An one-directional example of detecting an edge of an image utilizing the function is illustrated in FIGS. 5A and 5B.

Figure 5A:
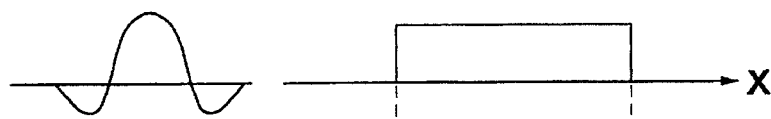
FIG. 5A is a diagram illustrating the $\nabla^2 G$ function and an input of the rectangular shape.
Figure 5B:
FIG. 5B is a diagram illustrating the convolution result of FIG. 5A.

FIG. 5A shows a $\nabla^2 G$ function and an input of a rectangular shape. FIG. 5B shows the convolution result of the $\nabla^2 G$ function and the input of rectangular shape. By convolution-operating this input with the function of $\nabla^2 G(x)$, a calculation result is obtained which has zero crossings at positions corresponding to edges of the rectangular shape. At each of the zero crossings, a value is changed from positive to negative or vice versa. These positions are the edges of the rectangular shape. Although the positive values of the result are utilized as the edges, the zero crossings should be detected for an accurate position detection.

On the other hand, the function $\nabla^2 G$ can be derived by diffusing the values of $(-\alpha, 2\alpha, -\alpha)$ in a one-dimensional case and the values of $(-\alpha, 4\alpha, -\alpha)$ in a two-dimensional case. The one-dimensional case has an $\alpha$ of ¼ is shown by solid line graphs in FIGS. 4A and 4B. FIG. 4A shows the state $(-¼, 2/4, -¼)$ which has the value of $(-\alpha, 2\alpha, -\alpha)$. After a diffusion step, a state $(-1/16, 2/16, 2/16, 2/16, -1/16)$ is obtained. After one more diffusion, a state $(-1/64, -2/64, 1/64, 4/64, 1/64, -2/64, -1/64)$ is obtained. FIG. 4B shows the result obtained after two diffusion steps. By further diffusion steps, the result approaches the form of the function $\nabla^2 G(x)$. This can be made the same as the function $\nabla^2 G(x)$ by a scale adjustment. However, such a scale adjustment is not always necessary since the edge can be obtained when the result has the same form as the function $\nabla^2 G(x)$. The graphs of FIGS. 5A and 5B illustrate a comparison of the size-adjusted result after diffusion with the function $\nabla^2 G(x)$. In accordance with the illustrated principle, for diffusing an input of $(-\alpha, 2\alpha, -\alpha)$, a prior operation of decaying a neuron to a value corresponding to $2\alpha$ times of the input value and inhibiting the neighboring neurons to a value corresponding to $-\alpha$ times of the input value should be performed. A layer capable of performing such an operation is the excitatory-center inhibitory-surround type neural network also known as a distribution neural network of FIG. 3. In other words, each neuron of the excitatory-center inhibitory-surround type neural network is connected to a directly-facing neuron in the diffusion neural network to transfer $2\alpha$ times of the excitation, thereby exciting the response. Neurons of the diffusion neural network is also connected to neurons adjacent to their corresponding directly-facing neurons in the excitatory-center inhibitory-surround neural network. These adjacent neurons transfer $-\alpha$ times of the excitation, thereby inhibiting the excitation. The diffusion neural network serves to diffuse the input value of $(-\alpha, 2\alpha, -\alpha)$ to the surround. By further diffusion steps, the function $\nabla^2 G(x)$ can be obtained. Accordingly, a convolution operation between the input image and the function $\nabla^2 G(x)$ is carried out in the neural network of FIG. 3. As a result, the edge of a target in the image is emphasized so that it can be detected. As the diffusion steps are repeated, the form of the $\nabla^2 G(x)$ has a spatial frequency characteristic exhibiting a varied center frequency. As a result, an edge having a varied spatial frequency is obtained at each diffusion step. In the case of a two-dimensional image, the neural network of FIG. 3 extends in two dimensions.

Figure 6:
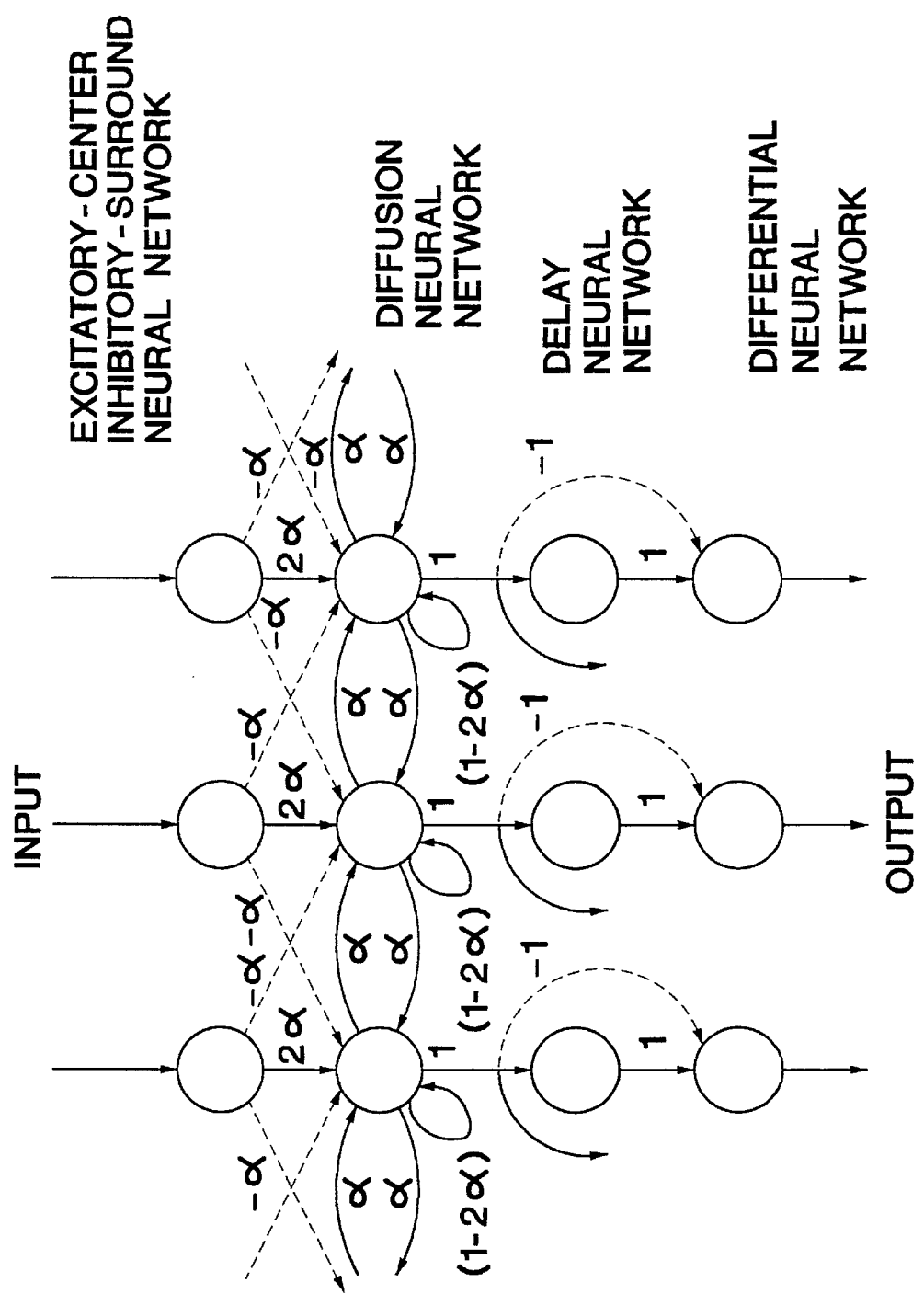
FIG. 6 is a diagram illustrating a one-dimensional neural network model for detecting spatial intensity changes of an input image by the lapse of time.

FIG. 6 illustrate a neural network obtained by simplifying $Z(x,y,t)$ for extracting an edge of a moving target in an image to make it correspond to a one-dimensional case. This neural network is constituted by an excitatory-center inhibitory-surround type neural network, a diffusion neural network, a delay neural network, and a differential neural network. The excitatory-center inhibitory-surround type neural network and the diffusion neural network are adapted to realize the function $\nabla 2G(x)$, as mentioned above in conjunction with FIG. 3. On the other hand, the delay neural network and the differential neural network are adapted to realize a time differential of $\partial/\partial t$.

The delay neural network temporarily stores a past value. The differential neural network derives a difference between a value directly received from the diffusion neural network and the past value output from the delay neural network. In other words, the differential operation is to calculate a difference between the result obtained by a past processing and the result obtained by a current processing. This operation is needed to detect a moving target in accordance with the present invention.

Therefore, the neural network of FIG. 6 has a total function of $\partial/\partial t(\nabla^2 G(x))$. When an input is received, the neural network of FIG. 6 deletes the background having no intensity change from the input by performing a $\nabla^2 G(x)$ operation. Then, the neural network performs a differential operation for deducting the current response from the past response, thereby sensing a moving target. As the differential operation is carried out under a condition that edges of objects exhibiting intensity changes are left after deleting the background, the edges of fixed objects are removed so that only the edges of moving objects will be left.

From the output of the neural network of FIG. 6, a $\nabla^2 G(x)$ operation result can be obtained. The output from this intermediate state represents the edge of the target. For a fixed target, the intensity of the output is gradually increased because of an accumulation of inputs. For a moving target, the neural network exhibits a weak response. In this case, the output can be used for selectively detecting a fixed target or moving target.

When the output of the neural network of FIG. 6 is expressed by a one-dimensional discrete equation, the output corresponds to the difference between the result obtained by an accumulation throughout n steps and the result obtained by a calculation throughout n-1 steps as follows:

$$Z(m,n) = -\nabla^2 G(m,n) * I(m,i) - $$
$$\nabla^2 G(m,n-1) * I(m,2) - \ldots - $$
$$\nabla^2 G(m,1) * I(m,n) + $$
$$\nabla^2 (m,n-1) * I(m,1) + $$
$$\nabla^2 G(m,n-2) * I(m,2) + \ldots + $$
$$\nabla^2 G(m,1) * I(m,n-1).$$

Figure 7A:
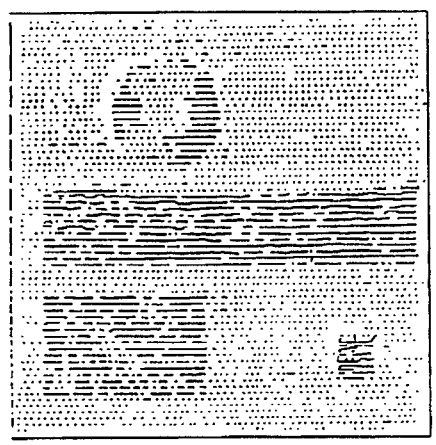
FIG. 7A is a pictorial schematic view illustrating an input image when a motion target has moved three steps.
Figure 7B:
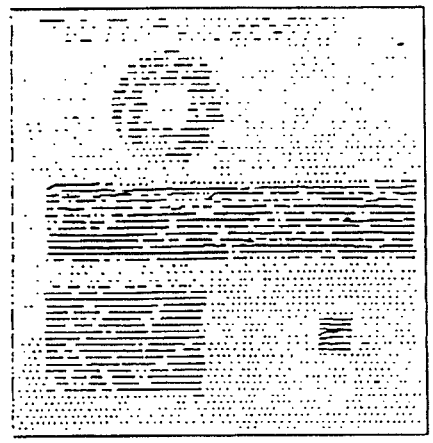
FIG. 7B is a pictorial schematic view illustrating an input image when a motion target has moved six steps.
Figure 7C:
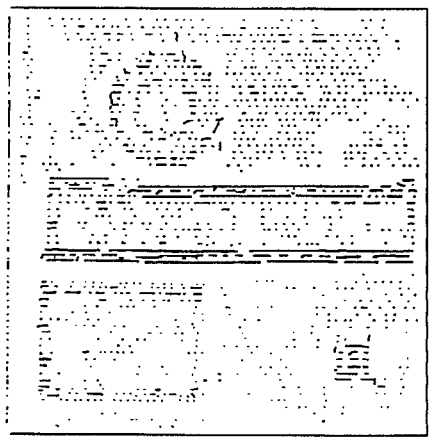
FIG. 7C is a pictorial schematic view illustrating an intermediate output state of the neural network model of FIG. 6 the input image of FIG. 7A.
Figure 7D:
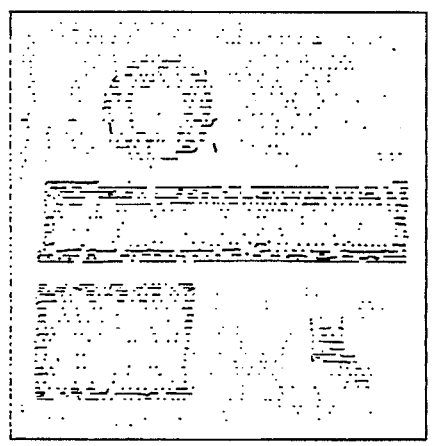
FIG. 7D is a pictorial schematic view illustrating an intermediate output state of the neural network model of FIG. 6 for the input image of FIG. 7A.
Figure 7E:
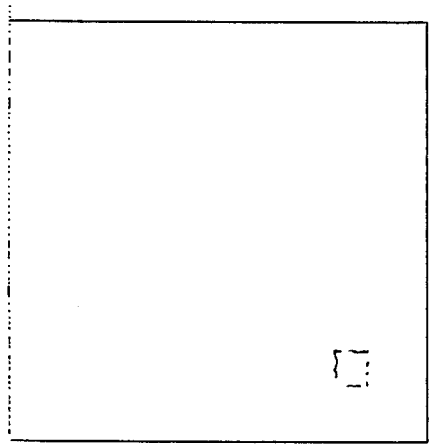
FIG. 7E is a pictorial schematic view Illustrating an output state of the neural network model of FIG. 6 for the input image of FIG. 7A.
Figure 7F:
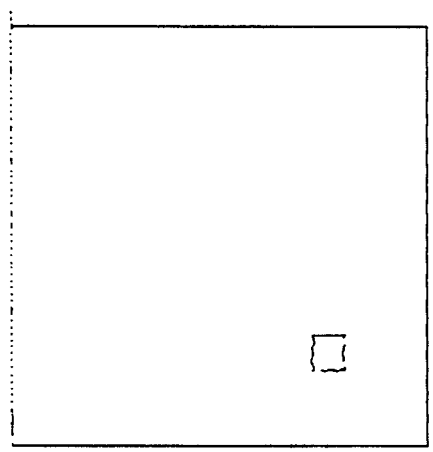
FIG. 7F is a pictorial schematic view illustrating an output state of the neural network model of FIG. 6 for the input image of FIG. 7B.

When an input includes a moving target, the input continuously changes with the lapse of time. This means that $I(m,1) \neq \ldots I(m,2)$. The n-th output $Z(m,n)$ of the neural network for the moving target will include all responses to the past tracks, in addition to the difference between inputs $I(m,n)$ and $i(m,l)$. Accordingly, the neural network can not only detect moving targets, but also obtain tracks of the moving targets, An example of such a case is illustrated in FIGS. 7A to 7F. FIGS. 7A and 7B show an image including a moving target and fixed targets. In this image, a small rectangular target positioned at the lower right area moves one step by one step. FIG. 7A shows the image when the moving target has moved three steps from the initial position. On the other hand, FIG. 7B shows the image when the moving target has moved six steps from the initial position. Where such a continuously moving target is given as an input, the neural network of FIG. 6 has outputs respectively shown in FIGS. 7C to 7F. FIGS. 7C and 7D show intermediate outputs state when the moving target has moved three steps and six steps, respectively. These outputs represent the result of $\nabla^2 G(x,y)$ operation as the response to the edges of the targets- In particular, it can be found that a higher response to the fixed target is obtained. FIGS. 7E and 7F show final outputs when the moving target has moved three steps and six steps, respectively. From these outputs, the moving target can be detected. As seen in FIG. 7E and 7F, a high response is obtained only for the moving target. Furthermore, the track of the moving target is well represented because the past information of the moving target has been stored. By detecting zero crossings from the above results, only the moving track can be extracted.

In accordance with the present invention, it is possible to detect an edge of an image by realizing a Gaussian function using a diffusion neural network and realizing a $\nabla^2 G$ operation using an excitatory-center inhibitory-surround type neural network end e diffusion neural network. Where an image includes both a fixed target and a moving target, an operation of $\partial/\partial t(v^2 G)$ is realized by an excitatory-center inhibitory-surround type neural network, a diffusion neural network, a delay neural network, and a differential neural network. In this case, the background of the image is deleted by the $\nabla^2 G$ operation to detect edges of the targets. The obtained result is then processed by the $\partial/\partial t$ operation to delete the fixed target and detect the moving target. Since these neural networks perform diffusion processes for the input values, the past information is maintained and widely distributed in the diffusion neural networks. As a result, a track of past motion is represented, By each diffusion step, the form of $\nabla^2 G$ function becomes broader. This makes it possible to extract edges of different spatial frequencies. This system also has a characteristic of strong resistance to noise by virtue of an operation of the Gaussian function.

The neural networks of the present invention illustrated in FIGS. 1, 3 and 6 have a simple construction because interconnections of the are simple, as compared to a LOG mask, thereby enabling a hardware implementation such as an electronic Implementation and an optical implementation. When the neural networks are implemented in hardware, an edge of an image ten be extracted in a short time for example, several clocks. Since all past information is accumulated in the diffusion neural network, a large quantity of past information can be stored in a small neural network. The hardware embodiment is very easy to implement by virtue of very simple Interconnections among neurons, a very small effect of erroneous connection values. In accordance with the present invention, it is possible to detect edges of different spatial frequency components at each diffusion step. This means that meaningful image information can be obtained.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for extracting edges of an object from an image signal, comprising:

a distribution neural network including a plurality of neurons, each neuron inducing an excitatory response based on a first predetermined connection weight value according to an intensity of said image signal, and inducing an inhibitory response based on a second predetermined weight value according to said intensity of said image signal; and a diffusion neural network including a plurality of neurons for forming a Gaussian distribution representing a regularity of the excitatory and inhibitory responses, each neuron of said diffusion neural network superposing said excitatory response induced by a corresponding neuron of said distribution neural network and said inhibitory responses induced by neurons of said distribution neural network, which are adjacent to said corresponding neuron of said distribution neural network, and diffusing a superposed signal generated by said superposing to form said Gaussian distribution, and the diffusion neural network convolving the Gaussian distribution and the image signal to detect edges of an object in an image represented by said image signal.

2. The apparatus of claim 1, wherein edges are detected as zero-crossings from a signal output from said diffusion neural network.

3. The apparatus of claim 1, wherein said first predetermined connection weight value is $2\alpha$ in a one-dimensional case, where $\alpha$ is a diffusivity of each neuron of said distribution neural network.

4. The apparatus of claim 1, wherein said first predetermined connection weight value is $4\alpha$ in a two-dimensional case, where $\alpha$ is a diffusivity of each neuron of said distribution neural network.

5. The apparatus of claim 1, wherein said second predetermined connection weight value is $-\alpha$, where $\alpha$ is a diffusivity of each neuron of said distribution neural network.

6. The apparatus of claim 1, wherein said diffusion neural network has a normalized self decay of $(1-2\alpha)$, where $\alpha$ is a diffusivity of a neuron therein.

7. An apparatus for extracting edges of an object from an image signal, comprising:

a distribution neural network including a plurality of neurons, each neuron inducing an excitatory response based on a first predetermined connection weight value according to an intensity of said image signal, and inducing an inhibitory response based on a second predetermined weight value according to said intensity of said image signal; and a diffusion neural network including a plurality of neurons for forming a Gaussian distribution representing a regularity of the excitatory and inhibitory responses, each neuron of said diffusion neural network superposing said excitatory response induced by a corresponding neuron of said distribution neural network and said inhibitory responses induced by neurons of said distribution neural network, which are adjacent to said corresponding neuron of said distribution neural network, and diffusing a superposed signal generated by said superposing to form said Gaussian distribution, and the diffusion neural network convolving the Gaussian distribution and the image signal;

a delay means for delaying an output signal from said diffusion neural network; and a differential means for obtaining a difference between said output signal from said diffusion neural network and a signal output from said delay means to detect edges of a moving object in an image represented by said image signal.

8. The apparatus of claim 7, wherein
a track of said moving object is detected from said image signal by detecting zero-crossings of a signal outputted from said differential means.

9. A method for extracting an edge from an image signal, comprising the steps of:

(a) receiving, with a first neural network including a plurality of neurons, said image signal;

(b) each neuron of said first neural network inducing an excitatory response based on a first predetermined connection weight value according to an intensity of said image signal;

(c) each neuron of said first neural network inducing an inhibitory response based on a second predetermined connection weight value according to said intensity of said image signal;

(d) deriving, with a second neural network including a plurality of neurons, a Gaussian distribution representing a regularity of the excitatory and inhibitory responses, wherein each neuron of said second neural network superposes said excitatory response induced by a corresponding neuron of said first neural network and said inhibitory responses induced by neurons of said first neural network, which are adjacent to said corresponding neuron of said first neural network, and diffusing a superposed signal generated by said superposing;

(e) convolving said Gaussian distribution and said image signal; and (f) detecting edges of a fixed object from a signal output at said step (e).

10. The method of claim 9, wherein said step (f) detects edges as zero-crossings of said signal output at said step (e).

11. The method of claim 9, wherein said first predetermined connection weight value is $2\alpha$ in a one-dimensional case, where $\alpha$ is a diffusivity of each neuron in said first neural network.

12. The method of claim 9, wherein said first predetermined connection weight value is $4\alpha$ in a two-dimensional case, where $\alpha$ is a diffusivity of each neuron in said first neural network.

13. The method of claim 9, wherein said second predetermined connection weight value is $-\alpha$, where $\alpha$ is a diffusivity of each neuron in said first neural network.

14. The method of claim 9, wherein said second neural network has a normalized self decay of $(1-2\alpha)$, where $\alpha$ is a diffusivity of a neuron therein.

15. The method of claim 9, wherein each neuron of said plurality of neurons in said second neural network is connected to an adjacent neuron with a diffusivity of $\alpha$.

16. A method for extracting an edge from an image signal, comprising the steps of:

(a) receiving, with a first neural network including a plurality of neurons, said image signal;

(b) each neuron of said first neural network inducing an excitatory response based on a first predetermined connection weight value according to an intensity of said image signal;

(c) each neuron of said first neural network inducing an inhibitory response based on a second predetermined connection weight value according to said intensity of said image signal;

(d) deriving, with a second neural network including a plurality of neurons, a Gaussian distribution representing a regularity of the excitatory and inhibitory responses, wherein each neuron of said second neural network superposes said excitatory response induced by a corresponding neuron of said first neural network and said inhibitory responses induced by neurons of said first neural network, which are adjacent to said corresponding neuron of said first neural network, and diffusing a superposed signal generated by said superposing;

(e) convolving said Gaussian distribution and said image signal;

(f) delaying an output signal from said step (e); and (g) obtaining a difference between said output signal at said step (e) and a signal output at said step (f) to detect edges of a moving object in an image represented by said image signal.

17. The method of claim 16, further comprising the step of (h) detecting a track of said moving object in said image signal by detecting zero-crossings from a signal output at said step (g).

* * * * *